(12) United States Patent
Brandner et al.

(10) Patent No.: US 8,070,069 B2
(45) Date of Patent: Dec. 6, 2011

(54) DEVICE AND METHOD FOR THE CONTACTLESS PERSONALIZATION OF CHIPS THAT ARE INTEGRATED INTO PASSPORTS

(76) Inventors: Wolfgang Brandner, Waldmünchen (DE); Werner Buchmeier, Weiding (DE)

( * ) Notice: Subject to any disclaimer, the term of this patent is extended or adjusted under 35 U.S.C. 154(b) by 838 days.

(21) Appl. No.: 11/794,183

(22) PCT Filed: Dec. 2, 2005

(86) PCT No.: PCT/EP2005/056408
§ 371 (c)(1),
(2), (4) Date: Jun. 20, 2008

(87) PCT Pub. No.: WO2006/069887
PCT Pub. Date: Jul. 6, 2006

(65) Prior Publication Data
US 2009/0041572 A1    Feb. 12, 2009

(30) Foreign Application Priority Data
Dec. 27, 2004   (DE) .......................... 10 2004 062 839

(51) Int. Cl.
*G06K 19/06*   (2006.01)
(52) U.S. Cl. ..................................... 235/492
(58) Field of Classification Search .................. 235/381, 235/384, 492, 475
See application file for complete search history.

(56) References Cited

U.S. PATENT DOCUMENTS 4,825,054 A * 4/1989 Rust et al. ................. 235/380

4,866,259 A   9/1989 Bonnemoy ................... 235/475
(Continued)

FOREIGN PATENT DOCUMENTS

DE       19504457       8/1996
(Continued)

OTHER PUBLICATIONS

Bundesministerium Des Innern; BSI; Dr. Kennis Kügler: Hintergrundinformation zum ePass: Technik & Sicherheit; Online; pp. 1-3, May 31, 2005.

(Continued)

*Primary Examiner* — Seung Lee
(74) *Attorney, Agent, or Firm* — John A. Miller; Miller IP Group, PLC

(57) ABSTRACT

The invention relates to a device and a method for the contactless personalisation of chips integrated into passports within a system for processing, sorting and packaging a large number of passports comprising a straight main transport path with a first transport direction for transporting the passports one behind the other through the system comprising a plurality of system modules for processing, sorting and/or packaging, with a respective straight first auxiliary transport path connected to the main transport path and arranged on either side thereof for leading the passports away from the main transport path in a second transport direction running perpendicular to the first transport direction, a plurality of coding stations arranged along the two first auxiliary transport paths and next to one another with respect to the first transport direction for coding the chips of the passports, and an equal plurality of transport elements which are respectively assigned to the coding stations and can be displaced in the first transport direction for picking up the passports from the auxiliary transport paths, positioning them above the associated coding stations and then depositing them on second auxiliary transport paths running back towards the main transport path with a third transport direction running parallel to the second transport direction.

9 Claims, 1 Drawing Sheet

U.S. PATENT DOCUMENTS

| | | | |
|---|---|---|---|
| 5,837,991 A | 11/1998 | LaManna et al. | 235/475 |
| 5,943,238 A * | 8/1999 | Nioche et al. | 700/121 |
| 6,027,020 A * | 2/2000 | Meyer-Wittreck et al. | 235/381 |
| 6,269,930 B1 * | 8/2001 | Dorner | 198/346.2 |
| 6,695,205 B1 * | 2/2004 | Lundstrom et al. | 235/380 |
| 6,783,067 B2 * | 8/2004 | Kreuter et al. | 235/381 |
| 7,234,637 B2 * | 6/2007 | Berthe | 235/380 |

FOREIGN PATENT DOCUMENTS

| | | |
|---|---|---|
| DE | 197 09 562 | 9/1998 |
| EP | 0 863 482 | 3/1998 |
| EP | 0 752 971 | 6/2001 |
| EP | 1 282 528 | 3/2004 |

OTHER PUBLICATIONS

International Search Report for PCT/EP2005/056408 dated Mar. 1, 2006.

* cited by examiner

DEVICE AND METHOD FOR THE CONTACTLESS PERSONALIZATION OF CHIPS THAT ARE INTEGRATED INTO PASSPORTS

The present application is a National Phase Application of International Application No. PCT/EP2005/056408, filed Dec. 2, 2005, which claims priority to German Patent Application No. 10 2004 062 839.4 filed Dec. 27, 2004, which applications are incorporated herein fully by this reference.

BACKGROUND OF THE INVENTION

1. Field of the Invention

The invention relates to a device and a method for the contactless personalisation of chips integrated into passports within a system for processing, sorting and packaging a large number of passports comprising a straight main transport path with a first transport direction for transporting the passports one behind the other through the system comprising a plurality of system modules for processing, sorting and/or packaging, according to the preambles of claims 1 and 5.

2. Discussion of the Related Art

As security considerations increase, there is an increasing demand for passports which include a chip containing personalisation data comprising passport-specific and person-specific data which can rapidly be read. In a system for processing, sorting and optionally packaging these passports in high numbers, such passports provided with integrated chips, so-called E-passports, must run through inter alia a system module for personalising the chips. In such systems comprising a plurality of modules for processing, sorting and/or packaging the passports, there is a desire not just for a high throughput, i.e. a maximum possible number of passports to be processed per unit time running through the machine, but also for 100% security during coding of the chips in respect of the reliable, in particular contactless, transmission of the coding data.

Systems are known in which passports are arranged one behind the other on a common transport path in order to successively pass through the individual system modules for processing, sorting and packaging the passports. Such systems usually receive the passports in the open condition and have a throughput which depends on the processing times of the coding system module, since the personalisation of the chips and thus of the passports which takes place in this module takes the longest processing time compared to the other system modules.

Since precise alignment of the passport with respect to a coding station carrying out the coding of the chip is necessary for the personalisation process by means of contactless coding, use is made of those single-lane or even multi-lane systems which allow simple handling of the open passports, including with regard to the precise positioning thereof. One example of such a multi-lane system is known from DE 197 09 562 C2, although this is from the field of chip card and/or magnetic strip card processing. In this system, all the system modules are installed next to one another along a suitable number of transport paths running parallel to one another. This leads to high production and maintenance costs of the system.

SUMMARY OF THE INVENTION

Accordingly, the object of the present invention is to provide a device and a method for the contactless personalisation of chips integrated into passports within a system for processing, sorting and/or packaging a large number of passports, by means of which a processing of the passports, in particular a coding of the chips, is possible with a high throughput, wherein the system is cost-effective to produce and operate.

This object is achieved in terms of the device by the features of claim 1 and in terms of the method by the features of claim 5.

In the device according to the invention for the contactless personalisation of chips integrated into passports within a system for processing, sorting and/or packaging a large number of passports comprising a straight main transport path with a first transport direction for transporting the passports one behind the other through the system comprising a plurality of system modules for processing, sorting and/or packaging, a respective straight first auxiliary transport path connected to the main transport path is arranged on either side thereof for leading the passports away from the main transport path in a second transport direction running perpendicular to the first transport direction. Arranged along the two first auxiliary transport paths is a plurality of coding stations arranged next to one another with respect to the first transport direction for coding the chips of the passports and an equal plurality of transport elements which are respectively assigned to the coding stations and can be displaced in the first transport direction for individually picking up the passports from the auxiliary transport paths. The transport elements position each passport above the associated coding station by displacing it in the first transport direction and then, after coding has taken place, deposit it on second auxiliary transport paths which run back towards the main transport path. The second auxiliary transport paths have a third transport direction running parallel to the second transport direction.

By arranging the plurality of coding stations on both sides of the main transport path, a simultaneous or time-offset coding of the chips can be carried out, which may include a preliminary initialisation, a pre-personalisation and the actual personalisation of the chip in a contactless manner. This leads to the coding process being divided between a plurality of coding stations, which are preferably five coding stations arranged next to one another on each side of the main transport path, so as thus to counteract a "traffic jam" effect of the passports constantly following one another on the main transport path in the region of a system module for personalising the chips.

By arranging such first and second auxiliary transport paths in combination with the coding stations arranged next to one another and the displaceable transport elements, it is possible to retain a main transport path for the further system modules for processing, sorting and/or packaging the passports, said further system modules being arranged in front of and behind the system module for personalising the chips.

Due to the arrangement of the coding stations on both sides of the main transport path, faster and easier distribution of the passports from the main transport path to the first auxiliary transport paths and a return to the main transport path via the second auxiliary transport paths is possible. This is made possible by means of two second pushers assigned to the first auxiliary transport paths for pushing the passports arranged on the main transport path onto the respective auxiliary transport path located opposite the pusher with respect to the main transport path.

The displaceable transport elements can preferably be stationed in a starting position on a side of the first auxiliary transport paths remote from the coding stations, so that unhindered transport of the passports is possible on the first auxiliary transport paths to the respective positions from which they are then pushed over the coding stations in the direction of the first transport direction by the transport element.

The transport elements are preferably designed as first pushers for pushing the passports assigned to them from the first auxiliary transport paths over the coding stations to the second auxiliary transport paths in a transport direction running parallel to the first transport direction. Above the coding stations, the passports are oriented by means of positioning devices in the direction of the first transport direction and—if this has not yet taken place in the region of the first auxiliary transport paths—perpendicular to the first transport direction. The actual coding of the chips can then take place with an electronic personalisation by contactless, biometric, person-specific data relating to the person assigned to this passport.

A method for the contactless personalisation of chips integrated into passports within a system for processing, sorting and/or packaging a large number of passports with a main transport path advantageously comprises the steps of diverting the passports from the main transport path onto first auxiliary transport paths arranged to the left and to the right which run perpendicular to the first transport direction of the main transport path, and positioning the passports in each case in front of one of the coding stations which are arranged along the first auxiliary transport paths and next to one another with respect to the first transport direction. The positioned passports are then displaced by means of transport elements assigned to the coding stations from the first transport paths to the coding stations and are contactlessly electronically coded or personalised there and, after coding has taken place, are displaced further to the second auxiliary transport paths.

A displacement from the first auxiliary transport paths to a coding station is carried out in a manner depending on whether the respective coding station is unoccupied.

The second auxiliary transport paths convey the coded passports perpendicular to the first transport direction back to the main transport path and transfer the passports to the main transport path.

The passports can then run through the following system modules on the main transport path, wherein the system modules may or may not be installed in the system, depending on requirements:

A system module for turning the pages of the passports may be used to subsequently carry out a personalisation on a further page of each passport.

Still during transport on the second auxiliary transport paths, an electronic functional check of the passports may be carried out on the way back from the coding stations to the main transport path. A common system for checking the personalised information is available for the respective coding stations arranged on each side of the main transport path. Via a Vision System OCR III, the entire MRZ is read and the hash value for the reading of the chip is formed. A check is carried out to ascertain whether the application has been correctly installed on the chip and can be selected. Various data groups, such as e.g. an applied image, the MRZ, etc., are accessed. The information from the chip is compared with the optical information from the MRZ line and the test results are recorded.

Once the check of the personalisation data has taken place, the passport is closed by means of a page-turning station. Based on the results of the chip test, a decision is made as to whether the passport will be further transferred for order packaging or will be deposited in a reject compartment.

A system module for sorting the passports may also be run through.

A further system module includes packaging, checking the packaged stack and labelling the stack.

There may be arranged upstream of the working module for personalisation a system module designed as a loader, by means of which a total of 1200 passports can be provided, distributed between for example 10 loading units. This leads to a machine throughput of up to 1200 passports per hour for an autonomy time of approx. 1 hour.

A further system module may be designed for passport positioning, in order to provide a Vision System for detecting serial numbers or other additional checking functions.

A page-turning station with an OCR I Vision System for reading the serial number may be arranged in a further system module. In order to be able to read the serial number, the passport cover must first be opened. The page-turning station is provided for this.

A further 10-digit serial number can be read by means of a further OCR II Vision System and a page-turning station arranged in front of it, wherein the serial number is arranged on a further page of the passport.

By means of a system module for RFID checking of the chip, a functional test of the chip is carried out so as to check the functionality of the RFID inlet and to read the UID (unique serial number) of the chip.

Further possible system modules include for example a further reject compartment for discarding those passports which have displayed faults during reading with the OCR I Vision System and the OCR II Vision System.

Further advantageous embodiments emerge from the dependent claims.

Advantages and expedient features can also be found in the following description in conjunction with the single FIGURE.

BRIEF DESCRIPTION OF THE DRAWINGS

The FIGURE shows, in a schematic plan view, a structure of a system for processing, sorting and/or packaging a large number of passports, which includes inter alia a system module 20 according to the invention for the personalisation of chips integrated in the passports.

DETAILED DESCRIPTION OF THE EMBODIMENTS

Figure 1:
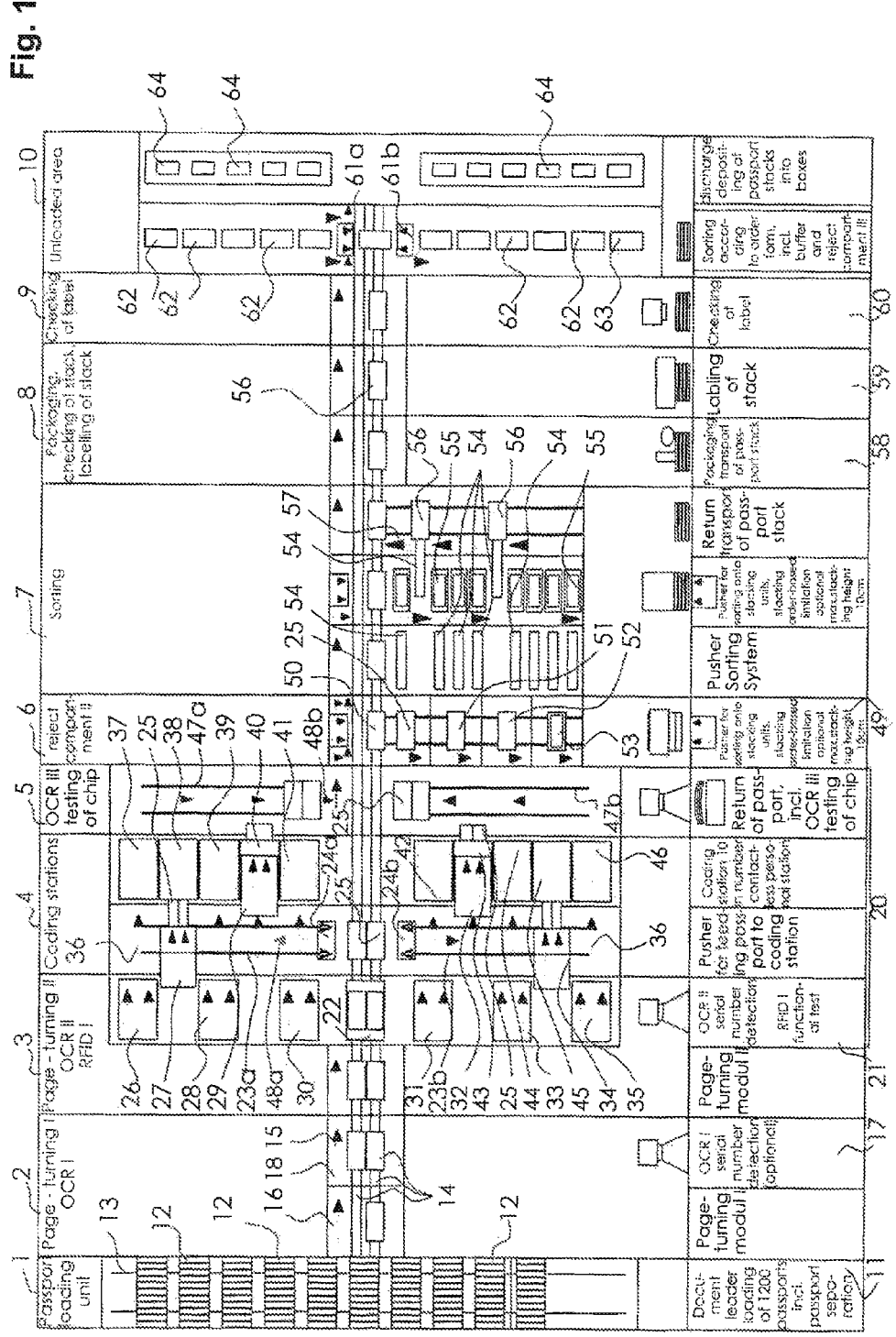

Such a system consists of the system modules passport loader 1, the system module 2 for turning the pages and detecting the serial number, the system module 3 for turning the pages and detecting a further serial number including an RFID functional test, the system module 4 with coding stations, the system module 5 with return transport of the passports and an OCR II Vision System check of the chips, the system module 6 for closing the passports and for discarding faulty passports, the system module 7 for sorting the passports, the system module 8 for packaging, checking, stacking and labelling the packaged stacks, the system module 9 for checking the label on the stack and the system module 10 with an unloading area for depositing the stacks of passports in various boxes.

In the system module 1—as shown by reference 11—the provision of 1200 passports including separation of the passports is possible in a document loader. To this end, the passports are placed in closed form into 10 loading units. Each loading unit has a capacity of up to 120 passports with a maximum passport thickness of 5 mm. When changing from one loading unit to the next, the provision of the passports takes place without any interruption. The capacity of the loader is thus up to 1200 passports.

The individual loading units 12 can be displaced on a rail 13 in order to be respectively positioned in front of a main transport path 14 for transferring the individual passports onto the main transport path 14.

The passports are transferred to the main transport path 14 via a separator. The handling of the passports by the separating system takes place in a suitable manner so that no damage is caused to the passport cover material. Passports with either hard or soft covers can be separated by means of the separating system.

The main transport path 14 has a first transport direction 15. In a first page-turning module 16, the passports are opened and further transported in the open state. In a serial number detection section 18, the serial number of the open passport is detected by means of OCR I technology, as illustrated by reference 17.

In a further page-turning mechanism section 19, the passports are further leafed through by one or more pages in order to carry out a further serial number detection by means of OCR II technology and optionally an RFID I functional test, as illustrated by reference 21. This relates to the section 22 along the main transport path 14.

In a system module 20 for personalising the passports, according to the invention the passports arriving on the main transport path 14 are diverted by means of first auxiliary transport paths 23a and 23b into a second transport direction 48a running perpendicular to the first transport direction 15. To this end, second pushers 24a and 24b are arranged at the ends of the auxiliary transport paths 23a and 23b facing towards the main transport path, in order to push the passports 25 from the main transport path 14 onto the auxiliary transport paths 23a and 23b.

Transport elements 26, 27, 28, 29, 30, 31, 32, 33, 34, 35 which can be displaced in the direction of the first transport direction 15 are arranged in their starting position counter to the first transport direction to the left of the auxiliary transport paths 23a and 23b and serve to displace the passports 25 transported on the auxiliary transport paths over respectively associated coding stations 37, 38, 39, 40, 41, 42, 43, 44, 45, 46, as indicated by the directional arrow 36. After being positioned above the individual coding stations 37-46, personalisation takes place by means of electronic contactless coding of the chips integrated in the passports. The transport elements 26-35 then push the passport with the coded chip onto a second auxiliary transport path 47a and 47b, which returns the passports in the open state to the main transport path 14. This is indicated by the arrows 48a and 48b.

While the passports are being returned on the second auxiliary transport paths 47a and 47b, at the same time an OCR II Vision System check of the coded chip can take place, in order to ascertain error-free coding of the chip. If errors are found here, the respective passports—which are meanwhile being transported on the main transport path—are discarded into a reject compartment in the system module 6. At the same time, the passports 25 which are still open are closed, as illustrated by reference 50, and are labelled as faulty passports by means of the method steps labelling, printing and stacking. This is illustrated by reference 49.

By means of pushers 54, passports 55 are assigned to individual stacks in the system module 7 for sorting, as predetermined for example by order forms. The stack 56 is then transported back to the main transport path 15. This is illustrated by the arrow 57.

The stacks 56 are further transported along the main transport path 14 with the first transport direction 15 and, in the system module 8, they are packaged and a check of the stack height is carried out, as illustrated by reference 58.

A labelling of the stack takes place as shown by reference 59. This label is then checked as shown by reference 60.

The stacks are then sorted to the left and to the right of the main transport path 14 by means of pushers 61a and 61b according to the order form, and where necessary are buffer-stored or discarded into a reject compartment. The reject compartment is denoted by reference 63. The passport stacks are then deposited in boxes 64.

All the features disclosed in the application documents are claimed as essential to the invention in so far as they are novel individually or in combination with respect to the prior art.

LIST OF REFERENCES

1-10 system modules of the system
11 representation of document loading
12 loading unit
13 loading unit rail
14 main transport path
15 first transport direction
16 page-turning module
17 representation of serial number detection
18 serial number detection section
19 leaf-turning module section
20 system module for personalising the chips
21 representation of OCR II serial number detection and RFID I functional test
22 section for carrying out the serial number detection and functional test
23a, 23b auxiliary transport paths
24a, 24b pushers
25 open passport
26-35 transport elements
36 displacement direction of the transport elements
37-46 coding stations
47a, 47b auxiliary transport path
48a second transport direction
48b third transport direction
49 representation of closing of passports
50 system module section for closing the passports
51, 52, 53 labelling, printing and stacking of discarded passports
54 pusher
55 closed passports
56 passport stack
57 transport direction of the closed passport stack
58 representation of packaging and checking of the stack height
59 representation of labelling the stacks
60 representation of checking the label
61a, 61b pushers
62 passport stack in the packaged state
63 reject compartment for passport stacks
64 boxes

What is claimed is:

1. A device for the contactless personalization of chips integrated into passports within a system for processing, sorting and packaging a large number of passports comprising a straight main transport path with a first transport direction for transporting the passports one behind the other through the system comprising a plurality of system modules for one or more of processing, sorting and packaging, characterized by;

a respective straight first auxiliary transport path connected to the main transport path and arranged on either side thereof for leading the passports away from the main transport path in a second transport direction running perpendicular to the first transport direction, and a plurality of coding stations arranged along the two first auxiliary transport paths and next to one another with respect to the first transport direction for coding the chips of the passports, and an equal plurality of transport elements which are respectively assigned to the coding stations and can be displaced in the first transport direction for picking up the passports from the first auxiliary transport paths, positioning them above the associated coding stations and then depositing them on second auxiliary transport paths running back towards the main transport path with a third transport direction running parallel to the second transport direction.

2. The device according to claim 1, characterized in that the displaceable transport elements can be stationed in a starting position on a side of the first auxiliary transport paths remote from the coding stations.

3. The device according to claim 1, characterized in that the transport elements are designed as first pushers for pushing the passports assigned to them from the first auxiliary transport path over the coding stations to the second auxiliary transport path in a transport direction running parallel to the first transport direction.

4. The device according to claim 1, characterized by two second pushers assigned to the first auxiliary transport path for pushing the passports arranged on the main transport path onto the respective first auxiliary transport path located opposite the second pusher with respect to the main transport path.

5. A method for the contactless personalization of chips integrated into passports within a system for processing, sorting and packaging a large number of passports, wherein the passports are transported through the system one behind the other from system module to system module on a straight main transport path with a first transport direction, characterized by;

in that the passports in a station for personalizing the chips on both sides of the main transport path are diverted onto a respective straight first auxiliary transport path with a second transport direction running perpendicular to the first transport direction, in order to be positioned in front of a plurality of coding stations arranged along the two first auxiliary transport paths and next to one another with respect to the first transport direction, in that, depending on whether the respective coding station is unoccupied, the positioned passports are displaced individually in a first transport direction by means of transport elements assigned to the coding stations from the first auxiliary transport paths to the coding stations and then, after coding has taken place, to second auxiliary transport paths, and in that the second auxiliary transport paths pass the passports back to the main transport path with a third transport direction running parallel to the second transport direction.

6. The method according to claim 5, characterized in that the transport elements are stationed in a starting position on a side of the first auxiliary transport paths remote from the coding stations.

7. The method according to claim 5, characterized in that an individual passport is displaced from the main transport path towards an unoccupied coding station on one of the first auxiliary transport paths by means of a pusher.

8. The method according to claim 5, characterized in that the chips of the passports are pre-personalized and personalized and optionally preliminarily initialized in the coding stations.

9. The method according to claim 5, characterized in that each passport is precisely positioned in the system module for personalization perpendicular to the first transport direction and then above the coding station parallel to the first transport direction.

* * * * *

UNITED STATES PATENT AND TRADEMARK OFFICE
CERTIFICATE OF CORRECTION

| | | |
|---|---|---|
| PATENT NO. | : 8,070,069 B2 | Page 1 of 1 |
| APPLICATION NO. | : 11/794183 | |
| DATED | : December 6, 2011 | |
| INVENTOR(S) | : Wolfgang Brandner and Werner Buchmeier | |

It is certified that error appears in the above-identified patent and that said Letters Patent is hereby corrected as shown below:

Title page, Item (73)

Please insert:

--(73) Assignee: Mühlbauer AG, Roding (DE)--.

Signed and Sealed this
Tenth Day of January, 2012

David J. Kappos
*Director of the United States Patent and Trademark Office*